United States Patent [19]

Simmons, III

[11] Patent Number: 4,681,834

[45] Date of Patent: Jul. 21, 1987

[54] OPTICAL RECORDING ELEMENT

[76] Inventor: Howard E. Simmons, III, 751 Crossan Dr., Newark, Del. 19711

[21] Appl. No.: 837,844

[22] Filed: Mar. 10, 1986

Related U.S. Application Data

[63] Continuation of Ser. No. 585,106, Mar. 1, 1984, Pat. No. 4,581,317.

[51] Int. Cl.$^4$ .............................................. G03C 5/24
[52] U.S. Cl. ..................................... 430/270; 430/276; 430/945; 430/286; 430/495; 346/135.1; 346/76 L
[58] Field of Search ............... 430/445, 276, 270, 338, 430/945, 286; 346/135.1, 76 L

[56] References Cited

U.S. PATENT DOCUMENTS

| | | | |
|---|---|---|---|
| 3,314,073 | 4/1967 | Becker | 346/76 |
| 3,474,457 | 10/1969 | Becker | 346/76 |
| 3,723,121 | 3/1973 | Hauser | 430/270 |
| 4,023,185 | 5/1977 | Bloom et al. | 346/135 |
| 4,097,895 | 6/1978 | Spong | 358/128 |
| 4,101,907 | 7/1978 | Bell et al. | 346/135 |
| 4,190,843 | 2/1980 | Spong | 346/1.1 |
| 4,219,826 | 8/1980 | Bloom et al. | 346/135.1 |
| 4,222,071 | 9/1980 | Heeger et al. | 252/518 |
| 4,241,355 | 12/1980 | Bloom et al. | 346/135.1 |
| 4,242,689 | 12/1980 | Bloom et al. | 346/135.1 |
| 4,270,132 | 5/1981 | Bell | 346/135.1 |
| 4,305,081 | 12/1981 | Spong | 346/135.1 |
| 4,315,269 | 2/1982 | Bloom et al. | 346/135.1 |
| 4,360,583 | 11/1982 | Engler et al. | 430/270 |
| 4,360,908 | 11/1982 | Howe et al. | 369/109 |
| 4,365,012 | 12/1982 | Hocker et al. | 430/338 |
| 4,388,387 | 6/1983 | Tsuboi | 430/495 |
| 4,465,767 | 8/1984 | Oba et al. | 430/945 |

OTHER PUBLICATIONS

R. A. Bartolini, et al.: "Review and Analysis of Optical Recording Media", Optical Engineering, vol. 15, No. 2, Mar./Apr. 1976, pp. 99–108.
Bell, A. E., Computer Design, Jan. 1983, pp. 133–146.
Bell, et al., IEEE Journal of Quantum Electronics, vol. QE-14, 1978, pp. 487–495.
Bartolini, J. Vac. Sci. Technology, vol. 18, No. 1, Jan.-/Feb. 1981, p. 70.
Marechal, E., Pure & Applied Chemistry, vol. 52, 1980, pp. 1923–1928.
Marechal, Progress in Organic Coatings, 10 (1982), pp. 251–287.

Primary Examiner—Won H. Louie
Attorney, Agent, or Firm—Don O. Winslow

[57] ABSTRACT

An optical recording element comprising a light-absorptive layer supported by a dimensionally stable substrate in which the light-absorptive material is a uniformly smooth, thin, homogeneous layer of film-forming polymeric dye having a light absorptivity of at least about 0.046 in the visible and/or infrared spectral regions.

2 Claims, No Drawings

OPTICAL RECORDING ELEMENT

This is a continuation of application Ser. No. 585,106, filed Mar. 1, 1984, U.S. Pat. No. 4,581,317.

FIELD OF INVENTION

The invention is directed to an optical recording element and, in particular, to such recording elements in which both the recording and playback of data utilize laser beams.

BACKGROUND OF THE INVENTION

In response to the demand for more reliable and higher capacity data storage and retrieval systems, there is considerable activity in the research and development of so-called optical disk recording systems. These systems utilize a highly focused modulated beam of light, such as a laser beam, which is directed onto a recording layer which is capable of absorbing a substantial amount of the light. The heat thusly produced causes the light-absorbing material in the areas struck by the highly focused laser beam to change chemically and/or physically, thus producing a concomitant change in optical properties, e.g., transmissivity or reflectivity, in the affected area. For readout, the contrast between the amount of light transmitted or reflected from the unaffected parts of the absorbing layer and from the marked areas of the layer is measured. Examples of such recording systems are disclosed in U.S. Patents throughout the literature and in numerous U.S. Patents such as U.S. Pat. Nos. 3,314,073 and 3,474,457. In recording data, a rotating disk having a light-absorptive recording layer is exposed to modulated radiation from a laser source. This radiation is passed through a modulator and appropriate optics, and the highly focused laser beam is directed onto the disk which forms by chemical and/or physical reaction of the light-absorbing layer a series of very small marks along a circular path within the light-absorptive layer. The frequency of the marks is determined by the modulator inputs. Using laser beams with a focused spot diameter of 1 $\mu$m or less, data can be stored at a density of $10^8$ bits/cm$^2$ or higher.

The simplest optical disk medium consists merely of a dimensionally stable solid substrate on which is coated a thin layer of light-absorptive material such as a metal layer. When the light-absorptive layer is struck by an intense beam of coherent light, such as from a laser source, the light-absorptive material is either vaporized and/or thermally degraded, thereby producing a very small marked area which exhibits different transmissivity or reflectivity than the adjacent unmarked layer. Multilayer antireflection structures, such as those disclosed in U.S. Pat. No. 4,305,081 to Spong and U.S. Pat. No. 4,270,132 to Bell, increase the absorption of the laser beam which also gives better read/write contrast than with the use of simple single layer media. Therefore, for purposes of obtaining better power efficiency, sensitivity and permanency of the record, it has been preferred to use multilayer antireflective structures.

There are two basic types of multilayer antireflective structures, one of which is basically a bilayer structure and the other a trilayer structure. In bilayer media, the substrate is coated with a very smooth, highly reflective material such as aluminum, on top of which is coated a layer of moderately light-absorptive material which is preferably of a thickness corresponding to about $\lambda/4n$, where $\lambda$ is the wavelength of the recording light source and n is the refractive index of the light-absorptive layer. In trilayer media, the substrate is likewise coated with a first layer of very smooth highly reflective material on which is coated a second layer of transparent material. Atop the transparent second layer is coated a thin third layer of strongly light-absorptive material. The combined thickness of the transparent and absorptive layers is preferably adjusted to be about $\lambda/4n$. In both types of structures, the adjustment of certain layer thicknesses according to the wavelength of light and refractive index of the layer is for the purpose of minimizing the amount of light reflected from the unmarked areas and maximizing the amount of light reflected from the marked areas, thus producing a higher playback signal amplitude. A detailed discussion of the three types of disk construction is given by A. E. Bell in *Computer Design.* Jan. 1983, pp. 133–146 and the references cited therein. See especially Bell and Spong, *IEEE Journal of Quantum Electronics,* Vol. QE-14, 1978, pp. 487–495.

It will be realized, of course, that the terms "bilayer" and "trilayer" refer only to the fundamental optical layers and do not exclude the use of ancillary layers. For example, a very thin layer of polymeric material may be interposed between the substrate and the reflective layer in order to compensate for insufficient smoothness of the substrate or to improve adhesion of the reflective layer. Also, one or more transparent layers may be coated over the light-absorptive layer to protect the fundamental layers from adhesive atmospheric conditions or to insulate thermally the other layers. Also, quite frequently the light-absorptive layer will be coated with a relatively thick layer of transparent material which serves as a defocusing layer which prevents surface dust and contaminants from interfering with the optical properties of the entire medium.

The desired properties of optical recording media are (1) high sensitivity, (2) high signal-to-noise ratio (SNR), (3) high tolerance to material variation, contaminants and other defects, and (4) high archival stability after extended storage and/or recording and readout (see Bartolini, *J. Vac. Sci. Technology* Vol. 18, No. 1, Jan.-/Feb. 1981, p. 70). Based upon these criteria, a considerable amount of research has been and continues to be carried out directed to obtaining the best possible disk materials. In particular, a majority of the work done up to this time on materials for the light-absorptive or recording layer has been directed to thin films of metals and chalcogenides such as tellurium and tellurium alloys, rhodium, bismuth, indium, lead, aluminum, platinum, nickel, titanium and silver. Of these, by far the greatest amount of work has been directed to the use of tellurium and its alloys with such elements as arsenic, antimony, selenium, germanium, phosphorus, silicon, thalium, indium, tin, copper, silver, iron, bismuth, aluminum, zinc and vanadium. Inorganic oxides such as lead oxide, tungsten oxide, titanium oxide, silicon oxide, zirconium oxide and the like have also been investigated and found to be suitable to some extent as the recording medium for optical disks.

In addition, considerable effort has been directed to finding suitable organic-based light-absorptive materials. These have been largely metal/polymer composites or dye/polymer composites. In the former case, finely divided metal particles are dispersed in an organic polymer medium. In the latter case, a dye is dissolved in, or finely divided pigment particles are dispersed in, an organic polymer medium.

The many issued patents which are directed to various dyes and dye/polymer dispersions are indicative of the high level of interest in such materials. Several patents disclose the idea of using as an absorptive medium a thin layer of deposited dye, e.g., U.S. Pat. Nos. 4,023,185 4,097,895, 4,101,907, 4,190,843, 4,218,689, 4,219,826, 4,241,355, 4,242,689 and 4,315,269. Other patents disclose the use of dispersions of dye in an organic polymer medium. For example, U.S. Pat. No. 3,314,073 to Becker discloses the use of dyed gelatin or India ink and U.S. Pat. No. 4,360,908 to Howe et al. discloses the use of (dialkylaminobenzylidene) ketone dyes dispersed in a cellulose nitrate binder. In a similar manner, U.S. Pat. No. 3,723,121 to Hauser discloses a process for laser beam recording using colored thermochromic materials which, when heated with the laser beam, change to a color which transmits the laser beam. The materials are used either by themselves or dispersed in finely divided form in a film-forming organic polymer such as polyvinyl alcohol and/or gelatin.

In a different vein, U.S. Pat. No. 4,360,583 to Engler et al. is directed to a process for duplicating an optical record by conventional UV exposure through a photomask. The light-absorptive layer is a film comprising functionally substituted tetraheterofulvalene and liquid halocarbon which co-react upon exposure to light. The photoreacted film is then solvent developed to produce contrasting light-absorptive image areas, which can be read by a laser beam.

Despite the great amount of research and development in this area of technology and the great number of materials tested, none of these has exhibited the capability of being formed into optically suitable imaging layers with both low cost of manufacture and with high performance reliability. In particular, the goals of economically achieving good sensitivity, high signal-to-noise ratio and exceptionally smooth surface characteristics have heretofore not been achieved.

BRIEF DESCRIPTION OF THE INVENTION

In its primary aspect, the invention is therefore directed to an optical recording element comprising a light-absorptive layer supported by a dimensionally stable substrate in which the light-absorptive material is a uniformly smooth, thin, homogeneous layer of film-forming polymeric dye having a light absorptivity of at least about 0.046 in the visible and/or infrared spectral regions. As used herein, the term light absorptivity means the optical density of a film of one micrometer thickness.

DETAILED DESCRIPTION OF THE INVENTION

A. Light-Absorptive Material

The light absorptive materials which are suitable as the active layer of the invention are film-forming polymers having chromophoric groups as part of the polymer molecule, that is, polymeric dyes. Thus, these materials differ substantially from the prior art optical disk materials in that, in this case, the chromophoric moieties are an integral part of the film-forming polymer—either as part of the polymer chain or pendent thereto—and not merely a dispersion of a dye compound or pigment in an organic medium.

The following terms are used herein in accordance with the definitions given in Hackh's Chemical Dictionary, 4th Edition, McGraw-Hill Book Company, NY (1969):

"Auxochrome" is a radical that intensifies the color of a chromophore or develops a color from a chromogen.

"Bathocrome" is an organic radical which displaces the absorption spectrum of an organic molecule toward the red.

"Chromogen" is a structural arrangement of atoms in many colored organic substances, e.g., $-N=N-$ "Thermal Diffusion Length" (l) is defined in U.S. Pat. No. 4,222,071 by the relationship $l = \sqrt{kY}$, in which k is the thermal diffusivity of the layer material and Y is the exposure time. A thin layer of low thermal diffusion length, i.e., having a diffusion length less than the diameter of focussed area of the recording beam, provides a highly sensitive recording medium.

As used herein, the term "film-forming" means that the polymeric dye is solid or semi-solid at room temperature and is capable of being formed into a coherent film by conventional coating or extrusion methods.

Polymers having chromophoric groups as part of the polymer molecules, i.e., polymeric dyes, can be made directly by both free radical and condensation polymerization techniques or they can be made by post-polymerization reaction of copolymers having pendent functional groups with reactive chromophoric materials in accordance with processes which are well known in the polymerization art. In the case of both free radical polymers and post-polymerization reaction polymers, the chromophoric and/or chromogenic moiety is generally pendent to the polymer chain, whereas in the condensation polymers, the chromophoric and/or chromogenic moiety is usually part of the polymer chain.

Condensation copolymers of the type which is suitable for use in the invention are disclosed in copending U.S. patent applications Ser. No. 514,890, filed July 18, 1983 and Ser. No. (PD-2015), filed concurrently herewith, which are incorporated herein by reference. These polymers are prepared by the condensation reaction in solvent medium of an aromatic polyamine such as 4,4'-diaminodiphenylamine, or a salt thereof, with malonaldehyde in the presence of a strong acid. As used herein, the term "polyamine" means an aromatic compound containing at least two reactive amine groups. Chromophoric aromatic polyamines are preferred.

The polymeric dyes produced from this reaction contain a highly conjugated polymethine-type chromophoric system as an integral part of its backbone structure and can be represented by the formula:

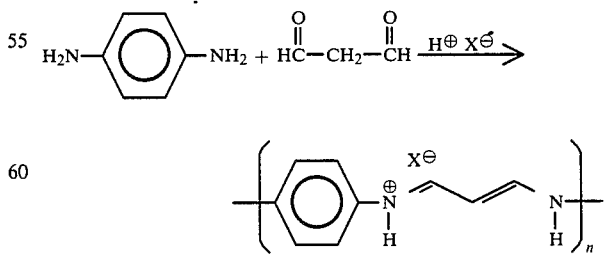

The polymethine-type structures referred to here may in some cases be referred to as iminium or amidinium ion moieties. Such groups can be found in cyanine-type dyes.

Other polymeric dyes of this type include those prepared by the condensation reaction of malonaldehyde with the following chromophoric polyamines:

p-phenylenediamine
4,4'-diaminobenzophenone
Solvent Green 3
Direct Black 22
1,4-diaminoanthraquinone
New Methylene Blue N
Oil Blue N
Pararosaniline Base
Thionin
Acid Black 48
Cresyl Violet Acetate
3,6-diamino-9-fluorenone
4,4'-diaminodiphenylamine
Solvent Blue 59
N,N,N',N'-tetrakis(p-aminophenyl)-p-phenylenediamine
Acid Fuchsin
Acid Blue 161
Acid Blue 45
Acid Alizarin Violet N
Nigrosine
3,6-diaminoacridine
Substituted 6,6-diphenyl-6H-chromeno[4,3-b]indoles and carbonium ion salts thereof
3,6-diamino-9-hydroxy fluorene analog of triphenylmethane
3,6-diamino-12-dimethylamino fluorene analog of triphenylmethane, HCl Similar condensation polymers can be prepared by reacting such polyamines with diacid chlorides to produce the corresponding polyamides such as the following:

| Polyamine | Diacid Chloride |
| --- | --- |
| Thionin | Adipoyl chloride |
| Solvent Blue 59 | Adipoyl chloride |
| Thionin | Sebacoyl chloride |
| Cresyl violet acetate | Sebacoyl chloride |

Reactions of this type can be represented by the following generalized reaction:

$$H_2N-Ar-NH_2 + Cl-\overset{O}{\overset{\|}{C}}+CH_2)_{\overline{x}}\overset{O}{\overset{\|}{C}}-Cl \xrightarrow[\text{solvent}]{\Delta}$$

$$+Ar-\overset{H}{N}-\overset{O}{\overset{\|}{C}}+CH_2)_{\overline{x}}\overset{O}{\overset{\|}{C}}-\overset{H}{N}+_{\overline{n}}$$

Likewise a still further class of condensation polymer can be prepared by the reaction of such diacid chlorides with the corresponding diphenols to produce the corresponding polyesters. Reaction of this type can be represented by the following generalized reaction:

$$HO-Ar-OH + Cl-\overset{O}{\overset{\|}{C}}+CH_2)_{\overline{x}}\overset{O}{\overset{\|}{C}}-Cl \text{ or}$$

$$Cl-\overset{O}{\overset{\|}{C}}+Ar)_{\overline{y}}\overset{O}{\overset{\|}{C}}-Cl \xrightarrow[\text{solvent}]{}$$

$$+Ar-O-\overset{O}{\overset{\|}{C}}+CH_2)_{\overline{x}}\overset{O}{\overset{\|}{C}}-O+_{\overline{n}} \text{ or } Ar-O-\overset{O}{\overset{\|}{C}}+Ar)_{\overline{y}}\overset{O}{\overset{\|}{C}}-O+_{\overline{n}}$$

In addition, there are many ethylenically unsaturated monomeric dyes which are capable of undergoing free radical polymerization such as the following:

(A) Phenyl-NH-C(=O)-CH=CH₂

(B) CH₂=CH-C(=O)-NH-[phenothiazinium] X⁻

(C) Acridine-NH-C(=O)-CH=CH₂

(D) Naphthyl-O-C(=O)-CH=CH₂

(E) Anthraquinonyl-O-C(=O)-CH=CH₂

(F) Phenyl-NH-C₆H₄-O-C(=O)-CH=CH₂

All of the above listed monomers produce polymers in which the chromophoric moieties are pendent to the polymer chain.

The preparation of polymeric dyes generally by copolycondensation and by free radical-initiated copolymerization is described by E. Marechal in *Pure & Applied Chemistry*, Vol. 52, 1980, pp. 1923-1928. See also E. Marechal, "Polymeric Dyes-Synthesis, Properties and Uses", *Process in Organic Coatings*, 10 (1982), 251-287.

When any of the above-described polymeric dyes are used as the light-absorptive material for the invention, several advantages are obtained: (1) the material is film forming and has substantial reflectivity; (2) very short imaging times are needed, e.g., ≦300 nsec and the polymer has low thermal diffusion length; (3) there is excellent contrast between the image (marked) and nonimaged (unmarked) areas; (4) the polymer material is relatively quite inexpensive; (5) the polymer can be applied economically such as by spin-coating techniques; (6) the polymer has good long-term stability and therefore would give permanence of records; and, (7) especially in the case of the above-described polymers containing the amidinium-ion chromophoric system, the layer absorbs a broad range of light in the visible and near infrared wavelengths.

A still further advantage of the invention is that the polymeric dye light-absorptive material can be made with a wide range of light absorptivity in a variety of ways. For example, a polymeric dye of given light absorptivity can be diluted with an inert, transparent and compatible polymer to whatever lower light absorption level may be desired. Conversely, light absorption by the polymeric dye can be increased in the same or in an expanded wavelength region by dispersing therein additional colorants such as dyes or finely divided particles of opaque solids such as carbon or metals which are completely inert toward the polymeric dye at ambient conditions. In the case of those polymeric dyes made by free radical polymerization and by post-polymerization reaction, the degree of absorptivity can be adjusted by raising or lowering the amount of functional copolymers in the polymerization reaction system. Similarly, in the case of polymers to which the chromophoric moieties are added by post-polymerization reactions, the concentration of those moieties and the absorptivity can be adjusted by raising or lowering the degree of reaction with whatever pendent functional groups are present.

The polymeric dyes of the invention can be treated with oxidants such as $AgAsF_6$ to shift the absorptivity of the polymer salt to longer wavelengths of light. They can also be treated with electron acceptors such as tetracyanoethylene (TCNE) or tetracyanoquinodimethane (TCNQ) and its derivatives to give stable charge-transfer complexes which have a similar shift in absorptivity. In particular, the TCNQ complexes exhibit intense absorption bands between 800 and 900 nm. Therefore, they are useful with near-IR diode laser sources.

In all cases, it is preferred that the polymeric dye contain a sufficient molar percentage of the chromophoric monomer to give the resultant polymer or copolymer a light absorption of at least about 0.046 at the selected wavelength of laser irradiation. It will, however, be recognized by those skilled in the art that in some instances the chromophoricity of a selected reaction species may result after incorporation in the polymer. That is, precursors of chromophoric moieties may be used as well as those materials which are chromophoric before their incorporation into the polymeric molecule.

When the polymeric dye is struck by a coherent beam of light such as a laser beam of sufficient power, a distinct mark is produced in the area of exposure. The mark may be the result of physical removal of the polymer layer to form a pit. On the other hand, the mark may be the result of chemical reaction since it is estimated that local temperatures in the marked area may reach as high as 800° C. or higher for quite short times on the order of only a few nanoseconds. Such a marking mechanism produces chemical changes which decrease the light absorptivity of the marked area and thus provides a readable contrast with the amount of light absorbed by the nonaffected areas of the layer. Because of this duality of mechanism, it is not at all essential that the polymer dye be affected throughout the layer thickness or that the underlying layer be exposed. In this regard, it is noted that the relative amount of chemical and/or physical change, e.g., by vaporization and thermal and chemical reactions may be affected by a thermal insulation effect of the adjoining layers and the dye layer itself which tend to inhibit dissipation of the thermal energy from the laser write beam. This effect may be expressed quantitatively as the thermal diffusion length. (See above). The precise mechanism of mark formation, therefore, is highly variable as well as ambiguous.

B. Substrate

The substrate materials which can be used in the invention are those which are dimensionally stable within the assembled structure. The substrate can be either opaque or transparent and can be made of virtually any of the conventional substrate materials such as aluminum, glass, quartz, copper, brass, steel, magnesium, cadmium, silver, gold, polyester film, poly(tetrafluoroethylene) film, polyamide films, and other plastic or composite materials. In some cases, the polymeric dye itself can be used as a substrate material. In addition, the substrate may be coated with a smooth layer of an adherent second material to provide further surface uniformity and/or to act as a base for other layers to be deposited thereon. In all cases it will be recognized that chemical inertness as well as dimensional stability over a prolonged period of time are essential properties of whatever substrate material is chosen.

C. Optical Medium Construction

Though not limited thereto, the most highly preferred optical medium configuration is a disk which typically has a diameter of 5–14 inches (12.5–35 cm). The optical recording elements of the invention can be of either single or multilayer construction. Thus, one or more layers of other materials may be interposed between the polymeric dye layer and the substrate and the polymeric dye layer may also be covered by one or more ancillary layers.

A simple optical recording medium is comprised of a flat aluminum disk on which is directly coated a thin layer of the polymeric dye of the invention which is reflective to the laser read beam. Although the reflectivity of the polymeric dye layer is less than the reflectivity of a metal coating, it has been observed quite surprisingly that the signal-to-noise ratio (SNR) of media using polymeric dye as the absorptive layer is comparable to the SNR of more complex media having metallic reflective layers and conventional light absorptive materials. For this reason, such simple media using polymeric dyes are suitable for most commercial applications and have the additional advantage of being more economical to fabricate than conventional multilayer media. For some applications, the resulting element may be comprised solely of a disk formed from the polymeric dye, the thickness of the disk being sufficiently greater than the depth of the laser write beam to give whatever dimensional stability is required for the intended use and storage conditions of the disk.

A more complex but practical medium is the bilayer disk which typically is comprised of a flat aluminum disk on which is coated a very thin and evenly coated polymer layer, e.g., acrylic polymer, to compensate for surface irregularities on the aluminum disk. On top of the polymer layer is a thin layer of highly reflective metal, such as aluminum, silver, copper or alloys thereof, atop which is coated a thin layer of the above-described light-absorptive polymeric dye. In this instance, the polymeric dye may be diluted with a compatible transparent polymer to provide the desired light absorption and layer thickness.

In turn, the polymeric dye layer may be protected with a thin transparent layer of inorganic or organic material to avoid either physical or chemical damage in the recording or reflective layers. The layer, or layers, overlying the recording layer may also serve a defocusing function as well as a protective function.

The composition of the overlying layer(s) is not particularly critical, except that it should be inert with respect to the underlying light-absorptive layer. Physically the overlying layer should be at least substantially transparent and preferably impermeable to ambient atmosphere and contaminants. Suitable materials for the overlying layers include polytetrafluoroethylene, polymethylmethacrylate, poly(vinylchloride), poly(ethylene terephthalate), silicon dioxide and the like.

A further quite practical construction for the recording medium is the trilayer disk. This construction utilizes the same layers and application procedures as the bilayer disk, but requires the interposition of a layer of transparent material between the reflective and polymeric dye layers. The thickness of the interposed layers is then adjusted to provide the necessary optical characteristics and to give the medium the required degree of reflectivity.

In manufacturing the optical recording media of this invention, the various layers are formed by many different techniques depending in large part upon the surface precision which is needed. For example, a polymeric leveling layer can be formed by coating the substrate with a thin solvent solution of the polymer and then removing the solvent by slow evaporation to avoid imperfections. Spin coating is especially effective to obtain very thin coatings of uniform thickness. On the other hand, when very thin polymeric coatings are needed, especially those requiring optical smoothness, techniques such as plasma-phase polymerization may be warranted. However, when relatively thick layers are permissible, preformed films can also be used, which are applied by lamination with heat and pressure. With respect to the reflective metal layer, however, sputtering and evaporation techniques are used to give most reliable results.

The invention will be better understood by reference to the following examples:

EXAMPLES

Example I—Polymeric Dye Synthesis

A. Polymerization

The reaction to form the polymeric dye is a condensation between an aromatic diamine and 1,3-propanedialdehyde (malonaldehyde) which results in a highly conjugated polymethine-type chromophoric system, for example as follows:

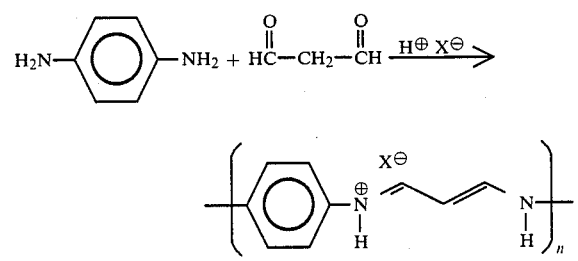

The absorption spectrum of the polymer can be tuned to the wavelength of the imaging and reading lasers by varying the structure of the aromatic diamine. Polymers have absorption in the visible and infrared wavelength regions have been prepared. The aromatic diamines which have been used in this reaction are listed above in the discussion of light-absorptive materials.

The reaction is carried out in dimethylsulfoxide (DMSO), N,N-dimethylformamide (DMF), 1-methyl-2-pyrrolidone (NMP) or a mixture of these solvents, chosen because they appear to be the best solvents for the polymer formed in the reaction. Allowing the product to remain in solution gives higher molecular weights. A few grains (1–25 g) of the aromatic diamine is dissolved in the solvent in a 500 ml resin kettle fitted with $N_2$ inlet and outlet and a Teflon ® fluorocarbon resin stirring blade. After a thorough $N_2$ purge, the malonaldehyde (equimolar quantity) is added. The malonaldehyde is added as the bis(dimethylacetal) since malonaldehyde itself cannot be isolated. The acetal (Aldrich, BP=183° C., $n_D^{20}$=1.4081, p=0.997, combustible liquid) readily decomposes to the aldehyde in the presence of acid. An equimolar equivalent of trifluoromethanesulfonic acid ($CF_3SO_3H$, Aldrich, BP 163° C., $n_D^{20}$=1.327, p=1.696, hygroscopic, corrosive) is added to the reaction mixture using a syringe after the malonaldehyde has mixed well into the solution. The resin kettle is immersed into a steam bath for 4–48 hours. The viscosity of the reaction mixture typically increases as the reaction proceeds. In some cases, a highly gelatinous mixture is obtained. The quantity of solvent is chosen to make up a 5–10% (by weight) reactants solution.

A second method has been used to control the release of malonaldehyde from the acetal form during the course of the reaction. In this second method, the aromatic diamine and acid are dissolved in a solvent (usually DMSO). Malonaldehyde bis(dimethylacetal) is dissolved in ~50 ml solvent and placed in a dropping funnel and this mixture was added to the slurried, steam-heated reaction mixture over a period of ~4 hours. The reaction was continued until polymerization occurred. In the Examples which follow, all of the polymeric dyes were made by one of these methods.

B. Purification

The most extensive studies have been carried out on the polymer (II), prepared from thionin (I) and malonaldehyde.

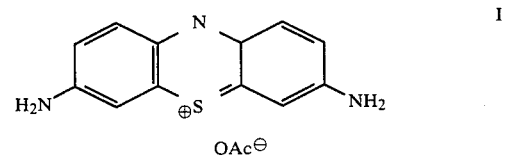

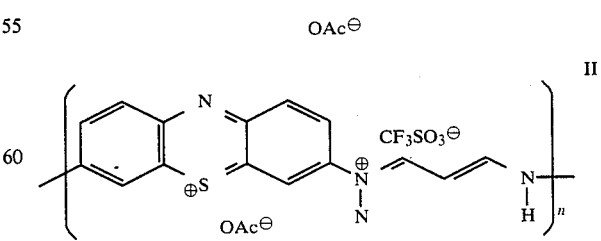

Thus, the following discussion refers to this thionin-containing polymer unless otherwise noted.

Thionin was purchased from Aldrich Chemical Co. in the form of the acetate salt (94–97% purity). A chloride salt can be used but the polymer formed is less soluble in dimethylsulfoxide. When thionin acetate is used in the polymerization, the reaction mixture forms a gelatinous mass after ~16 hours. An interesting property of this polymer gel is that when it is exposed to the laboratory atmosphere (after polymerization under nitrogen), the gel rapidly liquifies. Apparently the dimethylsulfoxide absorbs enough water to reduce substantially the mixture's viscosity. Gelation may be partly due to electrostatic interaction between the charged polymer chains and therefore water may interrupt this interaction. The film-forming characteristics of the product were tested by placing a few drops of the reaction mixture on a glass slide and removing the solvent by heating slowly on a hotplate. A highly reflective film with a brownish sheen was obtained. The film was brittle but had good adhesion to glass. Films stored in an oven (~125° C.) for several months showed no noticeable loss of reflectance or physical properties.

The product contained water-soluble impurities, which were easily leached from the polymer by soaking in water at room temperature. The polymer was purified by precipitation in distilled water. A quantity of the reaction mixture (in DMSO) was poured into an excess of distilled water, while mixing in a Waring blender. The solids were suction filtered, reblended and filtered again. This procedure was repeated until the filtrate was clean. After air drying, the solids, though readily soluble in conc. $H_2SO_4$, did not rapidly redissolve in DMSO. Significant redissolution required prolonged periods of milling in dilute solution. After all the solids redissolved, e.g. about 4-6 weeks with stirring, the solution was filtered through a 0.2 μm transverse-flow polypropylene filter in preparation for film casting. Difficulties in redissolution are attributed to polymer crosslinking, which may be reduced substantially by avoiding polymer dry-down.

Example II

Film Coating

A. Film Casting for Laser Imaging

Films were cast from purified and unpurified polymer solutions in dimethylsulfoxide by spin coating onto 2-inch by 3-inch glass slides. Film thicknesses were easily varied from fractions of a micron to several microns by adjusting the coating solution viscosity ($\leq$ ~15 Poise) and spinning rate. A Headway Research, Inc., Model EC101-CB15 photoresist spinner was used for all spin coating operations. The more viscous solutions required up to 3000 rpm to obtain a uniform film greater than 1 micron thick. Heat from an infrared (IR) lamp removed solvent from the film while spinning.

B. Laser Marking of Polymer Films

Samples were prepared for laser imaging by spin coating a small portion of a DMSO/polymer solution onto glass microscope slides (2 inch×3 inch×1 mm). Polymer solutions with viscosities between 5-15 Poise gave approximately 1 μm thick films at 2000-3000 rpm. Films on glass slides were tested for imaging, sensitivity and readout capability using pulsed $Ar^+$ (488 nm) and HeNe (633 nm) lasers capable of delivering up to 33 mW and 5 mW, respectively, to a sample surface. Samples were mounted on a computer-driven X-Y translation table and moved at a speed of 400 microns/second beneath an incoming laser pulse train (variable up to 100 μsec pulses; spaced ~10 msec apart) which produced a linear array of marks (typically pits). Readout was accomplished using reduced power ($\leq$0.8 mW) at the writing wavelength. The marks were detected by a decrease in light intensity reflected back to a photodetector. Reflectance of the polymer film surface ranged from 5-18% and the reflectance in the imaged area ranged from 0.5%.

Typical results for several polymers are summarized in Table 1 below:

TABLE 1

| Laser Marking of Polymeric Dye Films | | | | |
|---|---|---|---|---|
| Polymer Absorptivity (λmax) | Laser Type | % Reflect. at Laser Wave Length[1] | Minimum Laser Pulse Width for Detection of Image Using Opt. Microscope (800X) | Write Laser Power at Sample Surface |
| 400 nm (633 nm) | HeNe | 15% | 10 μsec | 3.5 mW |

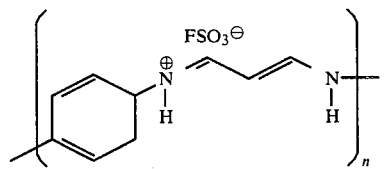

| | | | | |
|---|---|---|---|---|
| 490 | HeNe | 18% | 1 μsec | 3.5 mW |

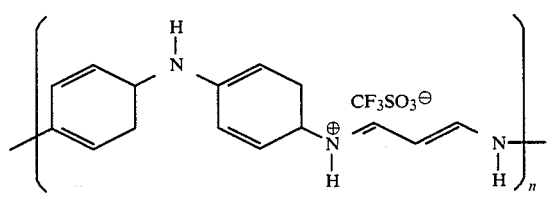

| | | | | |
|---|---|---|---|---|
| 550 | HeNe | 12% | 700 nsec | 2-5 mW |

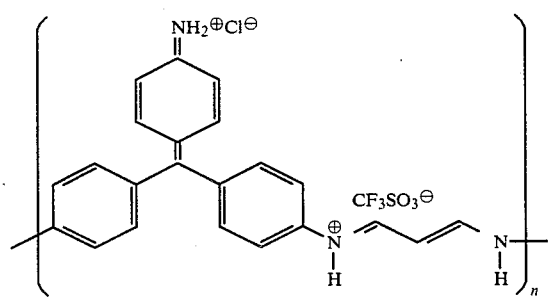

| | | | | |
|---|---|---|---|---|
| 630 nm | HeNe | 15% | 300 nsec | 2.5 mW |

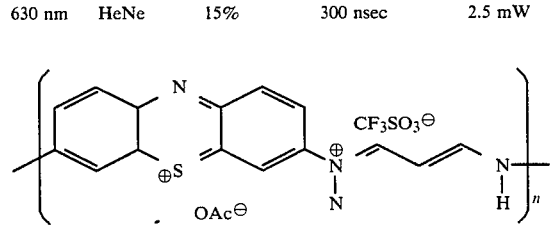

| | | | | |
|---|---|---|---|---|
| 630 nm (488 nm) | $Ar^+$ | 15% | 50 nsec | 33 mW |

TABLE 1-continued

Laser Marking of Polymeric Dye Films

| Polymer Absorptivity (λmax) | Laser Type | % Reflect. at Laser Wave Length[1] | Minimum Laser Pulse Width for Detection of Image Using Opt. Microscope (800X) | Write Laser Power at Sample Surface |
|---|---|---|---|---|

[Chemical structure shown: a polymeric dye structure containing N, ⊕S, OAc⊖, CF₃SO₃⊖, and repeating unit with N—H]

[1]633 nm for HeNe; 488 nm for Ar⁺

Imaging sensitivity was very reproducible. Readout of image samples was accomplished by rescanning a line or array of pits with laser power reduced to 100–800μ watt. The signal from the reflected light gathered by a photodetector was displayed on an oscilloscope and printed out on an X-Y recorder. Even short pulse widths gave good contrast between the unimaged background and imaged pit. Readout response was also very reproducible from one sample to another.

Stability of imaged samples was tested on a hot-stage microscope by focusing on a sequence of pits at room temperature and then examining the pits at various temperatures at a heating rate of 5° C./min. The pits remained clearly visible and apparently unharmed as the sample was heated to 250° C. and then cooled back down to room temperature. The only noticeable effect of the heat treatment was sublimation of some material on the sample surface as the temperature was elevated. This material is believed to have been unreacted aromatic diamine. However, at 250° C., this sublimation ceased. Nevertheless, the sample was still highly reflective after the heat treatment.

Example III

Preparation of Polyamide Dye 2.00 g of thionin acetate (7.0 mmole), 1.82 ml triethylamine (14.0 mmole) and 1.40 ml of sebacoyl chloride (7.0 mole) were added to 100 ml of 1-methyl-2-pyrrolidinone in a 250 ml Erlenmeyer flask fitted with a drying tube. The solution was stirred at 72° C. for 4 hours. The solution thickened as the reaction proceeded. A small volume of the reaction solution was evaporated onto a glass slide on a hot plate. A shiny film resulted.

EXAMPLE IV

Preferred Optical Disk Construction

A clean 14-inch O.D.×6⅝-inch I.D.×~2 mm thick aluminum disk is placed on a Headway Research Model LS 510 spin coater with an automatic dispenser arm. A solution is prepared comprising an acrylic polymer[1] in 1 mol % aqueous NH₄OH containing zinc acetate (2:1 MAA:Zn acetate, molar basis). The solution having a viscosity of about 200 cp is filtered through a 0.2 μm polypropylene filter and is deposited on the disk at ~30–50 rpm. The entire surface of the disc is covered with the acrylic polymer solution. The disk is then spun rapidly to ~400–1000 rpm. Excess acrylic polymer solution is thrown off the disk surface leaving behind a uniform solution layer. Most of the water and ammonia is removed from the layer during the 400–1000 rpm spin step. Residual solvent and ammonia is removed in a 125° C. oven. A uniform film approximately 4 μm thick is obtained after dry down. Because the bare aluminum layer is not smooth enough to coat thereon uniformly ultrathin (<1 μm) coatings, the acrylic layer serves as a smoothing layer. It also serves as an adhesion promoting layer.

[1]MMA/EA/MAA, 48/27/25 by weight, IV ~0.8.

After drying, the aluminum disk with its smoothing layer is placed back on the spin coater. A solution of polymeric dye in dimethylsulfoxide (filtered through 0.2 μm pore polypropylene filter and having Brookfield viscosity between 5 centipoise and 200 centipoise) is deposited on the rotating disk at ~30–50 rpm. The entire surface of the disk is covered with the polymeric dye solution. Preferred polymeric dyes are those prepared from the following monomers (condensation polymerizations):

(1) thionin+malonaldehyde bis(dimethylacetal) (Ar⁺ laser-sensitive),
(2) N,N,N',N'-tetrakis-(p-aminophenyl)-p-phenylenediamine+malonaldehyde bis(dimethylacetal) (Ar⁺ laser-sensitive), and
(3) N,N,N',N'-tetrakis-(p-aminophenyl)-p-phenylenediamine+malonaldehyde bis(dimethylacetal) oxidized with silver hexafluoroarsenate (diode laser-sensitive).
(4) N,N,N',N'-tetrakis-(p-aminophenyl)-p-phenylenediamine+malonaldehyde bis(dimethylacetal)+7,7,8,8-tetracyanoquinodimethane (TCNQ) (diode laser-sensitive).

The rotation of the disk is increased to 300–1000 rpm. The excess polymeric dye solution is thrown off the disk leaving behind a uniform, smooth solution layer. The dimethylsulfoxide is evaporated from the layer by heating under an infrared lamp while the disk is spinning. Residual solvent is removed by further heating in a 100° C. oven. Polymeric dye films having thicknesses from 100 Å to 1 μm are coated.

The aluminum disk with smoothing layer and polymeric dye active layer is again placed back on the spin coater. A solution of an organosilane (filtered through 0.2-μm pore polypropylene filter; Brookfield viscosity ~10–100 centipoise), e.g., General Electric RTV 6159, RTV 615, RTV 670 or RTV 655, is deposited on the disk which is rotating at ~30–50 rpm. The rotation of the disk is increased to 500–1500 rpm. Excess silane solution is thrown off the disk leaving behind a smooth, uniform solution layer. The silane is cured by heating in a 100° C. oven. A flexible layer ~500 Å–1 μm thick is obtained.

A 7-mil±0.5 mil poly(methylmethacrylate) dust defocusing layer is either laminated to the disk containing smoothing, active and flexible layers (with the aid of an adhesive layer) or a UV-curable film (7 mil thick) is laminated to the disk (with the aid of an adhesive layer) and exposed with a UV source to form a dust defocusing layer. The completed disk may be stored in a cassette when not in use.

I claim:

1. An optical recording element comprising a light-absorptive layer supported by a dimensionally stable substrate in which the light-absorptive material is a uniformly smooth, thin, homogeneous layer comprising a film-forming polymeric dye diluted with an inert, transparent and compatible polymer to lower the light absorption level thereof, said light-absorptive material having a light absorptivity of at least 0.046 in the visible and/or infrared spectral regions.

2. An optical recording element having bilayer configuration comprising a light-absorptive layer supported by a dimensionally stable substrate in which the light-absorptive material is a uniformly smooth, thin, homogeneous layer comprising a film-forming polymeric dye diluted with an inert, transparent and compatible polymer to lower the light absorption level thereof, said light-absorptive material having a light absorptivity of at least 0.046 in the visible and/or infrared spectral regions.

* * * * *

UNITED STATES PATENT AND TRADEMARK OFFICE
CERTIFICATE OF CORRECTION

PATENT NO. : 4,681,834

DATED : July 21, 1987

INVENTOR(S) : Howard E. Simmons III

It is certified that error appears in the above-identified patent and that said Letters Patent is hereby corrected as shown below:

On the title page, E. I. du Pont de Nemours and Company should be identified as the Assignee.

Signed and Sealed this

Thirtieth Day of August, 1988

Attest:

DONALD J. QUIGG

Attesting Officer        Commissioner of Patents and Trademarks